US007563490B2

(12) United States Patent
Nishi et al.

(10) Patent No.: US 7,563,490 B2
(45) Date of Patent: Jul. 21, 2009

(54) LIQUID CRYSTAL DISPLAY DEVICE

(75) Inventors: Takeshi Nishi, Atsugi (JP); Tetsuji Ishitani, Atsugi (JP); Daisuke Kubota, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 607 days.

(21) Appl. No.: 11/288,215

(22) Filed: Nov. 29, 2005

(65) Prior Publication Data

US 2006/0158589 A1 Jul. 20, 2006

(30) Foreign Application Priority Data

Dec. 6, 2004 (JP) ............................. 2004-352264

(51) Int. Cl.
*C09K 19/00* (2006.01)
*C09K 19/06* (2006.01)
*C09K 19/52* (2006.01)

(52) U.S. Cl. .................... 428/1.1; 428/1.2; 428/1.3; 252/299.01; 252/299.6; 430/20

(58) Field of Classification Search ............ 252/299.01, 252/299.6; 428/1.1–1.3; 430/20
See application file for complete search history.

(56) References Cited

U.S. PATENT DOCUMENTS

| 5,473,450 | A | 12/1995 | Yamada et al. |
| 5,620,630 | A | 4/1997 | Onishi et al. |
| 5,635,106 | A | 6/1997 | Basturk et al. |
| 5,729,319 | A | 3/1998 | Inou et al. |
| 6,221,443 | B1 | 4/2001 | Kubota et al. |
| 6,452,650 | B1 | 9/2002 | Nakao et al. |
| 6,483,559 | B1 | 11/2002 | Hiraki et al. |
| 6,583,838 | B1 | 6/2003 | Hoke et al. |
| 6,638,781 | B1 | 10/2003 | Hirakata et al. |
| 6,797,096 | B2 | 9/2004 | Nam |
| 6,821,457 | B1 | 11/2004 | Natarajan et al. |
| 6,894,742 | B2 | 5/2005 | Inoue et al. |
| 6,899,823 | B2 | 5/2005 | Sato et al. |
| 6,977,704 | B2 * | 12/2005 | Kataoka ..................... 349/130 |
| 7,106,410 | B2 | 9/2006 | Kitson et al. |
| 7,173,281 | B2 | 2/2007 | Hirakata et al. |

FOREIGN PATENT DOCUMENTS

JP 11-264979 9/1999

OTHER PUBLICATIONS

Haralampidis et al. "A new class of oxidosqualene cyclases directs synthesis of antimicrobial phytoprotectants in monocots" *Proc. Natl. Acad. Sci. USA*, 98(23):13431-13436 (2001).
Herrera et al. "Cloning and characterization of the Arabidopsis thaliana lupeol synthase gene" *Phytochemistry*, 49(7):1905 (1998).
Husselstein-Muller et al. "Molecular cloning and expression in yeast of 2,3-oxidosqualene-triterpenoid cyclases from Arabidopsis thaliana" *Plant Mol. Biol.*, 45(1):75-92 (2001).
Ohmuro et al., "33.3: Development of Super-High-Image-Quality Vertical-Alignment-Mode LCD," SID Digest '97, SID International Symposium Digest of Technical Papers, pp. 845-848.
Sang Soo Kim, "15.4: Invited Paper: Super PVA Sets New State-of-the-Art For LCD-TV," SID Digest '04, SID International Symposium Digest of Technical Papers, pp. 760-763.

* cited by examiner

*Primary Examiner*—Geraldina Visconti
(74) *Attorney, Agent, or Firm*—Eric J. Robinson; Robinson Intellectual Property Law Office, P.C.

(57) ABSTRACT

In the present invention, it is an object to improve display quality by improving response speed of a liquid crystal element in a liquid crystal display device, in particular, response speed in the case of falling.

In the present invention, it is characterized that a liquid crystal layer is divided into plural regions (domains) substantially by mixing a compound including a liquid crystal skeleton in a liquid crystal layer exisiting liquid crystal molecules as a technique to improve response speed of a liquid crystal element in a liquid crystal display device for solving the above problem.

28 Claims, 8 Drawing Sheets

Micro dmain (× 200)

100 μm

Direction of
transmission axis
of polarizing plate

800

LIQUID CRYSTAL DISPLAY DEVICE

TECHNICAL FIELD

The present invention relates to a technique for improving a response speed of a display device (including a liquid crystal element) applying a liquid crystal.

BACKGROUND ART

A display device applying a liquid crystal material is used extensively as a light-weight and thin display device. The liquid crystal display device interposes a liquid crystal material between two pieces of flat plates such as glass substrates. By applying an electric field by at least one electrode arranged on a flat surface where the liquid crystal of a flat plate is arranged, a liquid crystal molecule is switched by the intensity and existence or nonexistence of the electric field. Since optical property of the liquid crystal is changed in conjunction with it, displaying of an image or the like is performed using this change of optical property.

A nematic liquid crystal is generally used as a liquid crystal material used for a liquid crystal element. A nematic liquid crystal means one of the categories distinguished by arranging status of liquid crystal molecules constituting a liquid crystal material. In addition, for example, there is a material such as a smectic liquid crystal. However, a nematic liquid crystal has a liquid property and flowability within an operating temperature range and is used extensively as a display in easiness of initial orientation of liquid crystal molecules and stability of orientation state, and breadth of operatable temperature range.

A hight of a contrast is given as one of the factorsto determine display performance of a display. A contrast is represented by a ratio of luminance of a light state and luminance of a dark state, and a high-grade image can be provided as the ratio becomes higher.

However, conventional TN (Twisted Nematic) mode and the like were difficult to get an ideal dark state since it is affected by a slight phase difference that a liquid crystal represented. This is because in the case of a TN mode, though a molecular major axis is shifted from a parallel state to a perpendicular state in an orientation state of liquid crystal molecules by means of applying an electric field, it is not easy particularly that a molecular in a place near to a substrate surface is shifted perpendicular to the substrate so that birefringence of liquid crystal in that portion remains.

Thus, a liquid crystal display device using a perpendicular orientation mode is suggested as a method to make contrast ratio better. (for example, see Non-Patent Document 1).

In a perpendicular orientation mode, a liquid crystal molecule is oriented in perpendicular direction with respect to a substrate surface of a liquid crystal display device beforehand, therefore, when an electric field is not applied to an electrode, transmitted light is interrupted by a polarizing plate. Meanwhile when an electric field is applied to an electrode (at a time of driving), a liquid crystal molecule exists with the state that declined from the perpendicular direction. It is a display method using that light-transmitting property is obtained by birefringence of these liquid crystal molecules.

In addition, in the perpendicular orientation mode, the state in which an electric field is not applied is a perpendicular orientation state and a black display is obtained. In the perpendicular orientation state, since a birefringence of liquid crystal does not appear, it is a driving mode in which light leak is small and a black display is theoretically easy to obtain.

Furthermore, in the case of a liquid crystal display device using nematic liquid crystal, a challenge is reducing time required for an operation of a liquid crystal molecule (hereinafter, response time) when a display signal is switched from one displaying state to the next displaying state. Note that, the response time which is needed when display is switched from state of OFF to a state of ON is referred to as "rising response time" and when display is switched from state of ON to the state of OFF is referred to as "falling response time". A method in which "rising response time" is shortened by driving wave form has been suggested. (for example, see Non-Patent Document 2).

In the case where display is made a state of ON from a state of OFF (in the case of rising), if electric field is made strongly, response speed can be made quickly since an orientation direction of liquid crystal molecules is controlled by electric field. However, in the case of display is made to a state of OFF from a state of ON (in the case of falling), control to improve response speed is difficult as compared to the case of rising since the OFF state can be obtained by returning liquid crystal molecules released from the control by the electric field to the orientation state before electric field has been applied. Thus, more improvement has been needed.

[Non-Patent Document 1]
K. Ohmuro, S. Kataoka, T. Sasaki, and Y. Koike, SID' 97 Digest of Tech. Papers, (1997) 845,

[Non-Patent Document 2]
S. Sang, SID' 04 Digest of Tech. Papers, (2004) 760

DISCLOSURE OF INVENTION

[Problem to be Solved by the Invention]

Thus, it is an object of the present invention to improve display quality by improving response speed of a liquid crystal element in case of a liquid crystal display device, particular, improving response speed in case of rising.

[Means for Solving the Problem]

In the present invention, it is characterized that a liquid crystal layer is divided into plural regions (domains) substantially by mixing a chemical compound including a liquid crystal skeleton in the liquid crystal layer in which liquid crystal molecules exist as a technique to improve response speed of a liquid crystal element in a liquid crystal display device to solve the above problem. In addition, a liquid crystal skeleton is a structure portion of a liquid crystalline monomer including liquid crystal and a polymerizable group. The polymerizable group is not refered to as a liquid crystal skeleton by itself.

Specifically, a liquid crystal display device of the present invention is characterized by including a pair of substrates each having an electrode formed on one surface thereof, a liquid crystal layer, and a pair of polarizing plates, in which the pair of substrates are arranged so that the surfaces on which the electrodes are formed are on the inside and face each other; in which the liquid crystal layer is sandwitched by the pair of substrates; in which the pair of substrates is sandwitched by the pair of polarizing plates; and in which the liquid crystal layer includes a liquid crystal molecule and a compound having liquid crystal skeleton.

Another structure of the liquid crystal display device of the present invention is characterized by including a pair of substrates each having an electrode formed on one surface thereof, a liquid crystal layer, and a pair of polarizing plates, in which a projection is formed in one of the electrodes; in which the pair of substrates is arranged so as to face the electrodes each other; in which the liquid crystal layer is sandwitched by the pair of substrates; in which the pair of substrates is sandwitched by the pair of polarizing plates; in which the liquid crystal layer includes a liquid crystal molecule and a compound having a liquid crystal skeleton.

In addition, in each of the above structures, the structure in which an active element which is connected electrically to the electrode is formed in either of the pair of substrates may be employed, and plural electrodes may be formed on the one of the substrates.

In each of the above structures, the chemical compound having the liquid crystal skeleton, may have the rate of 5 wt % to 15 wt % as a weight ratio with respect to the liquid crystal molecule.

In addition, the chemical compound having the liquid crystal skeleton includes a liquid crystalline monomer or a liquid crystalline polymer, and the liquid crystalline monomer is obtained by combining an aclyloyl oxy group with the liquid crystal skeleton while the liquid crystalline polymer is obtained by polymerizing a liquid crystalline monomer by irradiation of ultraviolet rays (UV) or the like.

In addition, the liquid crystal skeleton is one of a biphenyls skeleton, a tolans skeleton, an esters skeleton, an alkenyls skeleton, a cyclohexenes skeleton, azines skeleton, fluorine-containing condensed rings skeleton, and a naphthalenes skeleton.

EFFECT OF THE INVENTION

Since a force which affects an orientation of liquid crystal molecules in a liquid crystal layer (frictional force or the like) can be controlled, response time (in particular, falling response time when an electric field is not applied) can be improved by performing the present invention.

Additionally, in the present invention, when a chemical compound having a liquid crystal skeleton is mixed in a liquid crystal layer, plural domain regions can be formed in the liquid crystal layer without disarraying an orientation of liquid crystal molecules included in the liquid crystal layer and an effect between liquid crystal molecules can be suppressed.

Thus, in the structure of the present invention, since a response speed improves, reduction of an after image can be improved and a display quality can be improved. Note that, since a response speed improves, the present invention can be used for a display method which is expected high speed operation such as a field sequential drive.

BEST MODE FOR CARRYING OUT THE INVENTION

Embodiment Mode 1

This embodiment mode explains a case in which a liquid crystal layer including liquid crystal molecules are divided into plural regions as a method for improving response speed of liquid crystal. FIG. 1 shows a cross section of a liquid crystal element in a liquid crystal display device of the present invention and shows one of embodiment modes of the present invention. Reference numerals 101 and 102 are substrates, 103 and 104 are electrodes, 105 and 106 are orientation films, 108 is a liquid crystal layer, 107 is a chemical compound having a liquid crystal skeleton, 109 is a spacer, and 110 is a sealing material.

The substrates 101 and 102 are materials which can transmit visible light and for example, glass, plastic, or quartz can be used. When optical modulation of a liquid crystal material is controlled by an electrical signal like the present invention, an electrode to be explained hereinafter and a dielectric film to insulate an electrode are arranged over a surface of the substrate in an arbitrary form in some cases, however, a material which fulfills heat resistance and medical solution characteristics resistance is selected in order to manufacture and form at a desired specification. In addition, the substrate is required to have a thickness in which breakage does not occur by physical shock to itself at the manufacturing process or further after compleating as a display element. For example, in the case of a glass substrate, a material with a thickness of 2 mm or less is preferably used. At this point, a plastic plate can be formed thinner than glass.

Additionally, about light transmitting property of 101 and 102, when the liquid crystal display device is used as transmitting type, both substrates need to have light transmitting property and when it is used as reflecting type, at least one of them needs to have the property.

In addition, about the substrate it is desirable to use such a substrate that anisotropy of the refractive index is vanishingly small, besides the light transmitting property. This is for avoiding displaying unnecessary display property such that color tone is different depending on a viewing angle or the like when optical anisotropy except a liquid crystal material is included in the substrate.

A material having light transmitting property of visible light such as indium tin oxide is used for the electrodes 103 and 104. In particular, it is desirable to have transparency in a portion using optical modulation of a liquid crystal material. In addition, if one of the electrodes has transparency of visible light, the other electrode needs conductivity, and light transparency is not a requirement.

Additionally, a portion which does not contribute to display or a wiring to supply an electrical signal does not have to be always a transparent electrode.

In addition, an element having a structure in which only one pixel electrode exsists in a region where liquid crystal is filled is shown in FIG. 1, however, it is not necessary to be always bounded by this, even if plural pixels are formed on the substrate of the region in which liquid crystal is filled, there is no problem.

An organic compound such as polyimide, DLC (diamond-like carbon), and an inorganic compound such as $SiO_2$ can be used as the orientation films 105 and 106. Surfaces of the orientation films 105 and 106 are performed orientation treatment for orienting liquid crystal to a desired direction according to need. Flatness of the surface of the orientation film is adjusted arbitrarily depending on liquid crystal which is used. Since nematic liquid crystal has a low viscosity, it may be flattened or convexoconcave may be formed in an orientation film as shown in this figure because it follows a form of a surface of the orientation film if the orientation film has convexoconcave. Note that, a perpendicular orientation treatment that a major axis of a liquid crystal molecule becomes perpendicular is performed as an orientation treatment of the orientation film in the present invention.

A nematic material can be used as liquid crystal of the liquid crystal layer 108. It is necessary that dielectric anisotropy of this liquid crystal is negative.

The chemical compound having a liquid crystal skeleton 107 is included in the liquid crystal layer 108. Note that, a liquid crystalline monomer and a liquid crystalline polymer are included in the chemical compound having a liquid crystal skeleton 107.

Liquid crystalline monomer is a material which can orient by a normal liquid crystal orientation method like liquid crystal, in a monomeric substance (monomer) state. Liquid crystalline monomer can be made a polymer by polymerization reaction as against a normal liquid crystal material does not have reactivity in particular. Thus, when a liquid crystalline monomer is performed polymerization reaction in the orientation state, a polymer that molecular sequence of the liquid crystal skeleton is fixed while the orientation state is not changed, namely a liquid crystalline polymer can be formed.

Note that, a liquid crystalline monomer in the present invention is obtained by combining a liquid crystal skeleton with an acryloyl oxy group, and a biphenyls skeleton, a tolans skeleton, an esters skeleton, an alkenyls skeleton, a cyclohexenes skeleton, an azines skeleton, a fluorine-containing condensed rings skeleton, and a naphthalenes skeleton and the like are included in the liquid crystal skeleton here.

In the present invention, it is desirable that the chemical compound having a liquid crystal skeleton 107 is mixed at the rate of 5 wt % to 15 wt % in weight ratio as against a liquid crystal material forming the liquid crystal layer 108. Note that, it may be used as a liquid crystalline monomer in this state, however, the liquid crystalline monomer may be polymerized to form a liquid crystalline polymer by irradiating ultraviolet rays to or heating a liquid crystal material which mixed the liquid crystalline monomer. In addition, a liquid crystalline polymer exists with the state that arranged in the form of interspersion or network in the liquid crystal layer 108. The state which is arranged in the form of network means the state which forms a liquid crystalline polymer by polymerizing a polymerizable group of a liquid crystalline monomer dotted in the liquid crystal layer.

Note that, when the chemical compound having a liquid crystal skeleton exists in the liquid crystal layer 108, the liquid crystal layer 108 is divided by the chemical compound having a liquid crystal skeleton 107 which is arranged in the form of interspersion or network so that a domain is formed. In addition, a dimension of the domain is 100 μm or less. In other words, in the present invention, the state that liquid crystal molecules separates and exists in the liquid crystal layer 108 having plural domains is obtained. Accordingly, when an orientation is changed, a dullness of response at orientating perpendicularly without applying an electric field, in particular, can be improved since an effect between liquid crystal molecules can be suppressed compared with the case of existing liquid crystal molecules in the whole region of the liquid crystal layer 108.

The spacer 109 is a thing for keeping the substrate interval uniform, and a thing which can maintain a desired dimension of desired the substrate interval is used. A spacer is required to be a sphere and column. Sectional composition of trapezoidal form may be used.

The sealing material 110 is formed so as to surround a liquid crystal material for the purpose of bonding a substrate and preventing the liquid crystal material from flowing to the outside of the sealing material. A sealing material is an adhesive, and, a thermo curing type material or a light curing type material can be used. In addition, an epoxy resin, an acrylic resin, and the like can be used.

A projection 111 may be formed on the electrode 104 of the liquid crystal element. Note that, the projection 111 is a component that its form further protrudes from the height of a surface of the pixel electrode and it may be cylindrical form or wall form. Note that, a word of "column form" of "wall form" to compare the form of a projection is used in this specification, and all of them are included in the projection described in this specification. A wall form projection may be formed to be plural wall forms which is straight line form judging from a top view thereof and is parallel judging from a cross-sectional view thereof in a display region, or may be formed in curb form to completely surround each of pixel electrodes. In addition, there may be a void between walls instead of wall form which is closed completely. It may be contact with respect to a counter substrate as shown in FIG. 2(A) and liquid crystal may exist between a counter substrate and a projection like FIG. 2(B). A projection, a column, or a wall may be the same cycle as a pixel. Additionally, a part of projection may be protruded to a part of region of the pixel electrode in the range that does not disturb display, however, it must not spread through the whole pixel electrode.

As a material for forming the projection 111, an inorganic compound and an organic compound can be used. As for the inorganic compound, $SiO_2$, SiN, SiON or the like is given and as for the organic compound, acrylic resin, epoxy resin, resist, divinylbenzene or the like is given. Note that, adjacent pixel electrodes cannot display when they are not insulated, therefore, it is required that the projection 111 is an insulating substance.

In addition, the projection 111 may be formed by photolithography after a constitution material of the projection is formed to be a film once by CVD method or sputtering method, or may be formed by using printing, ink-jet method, evaporation method or the like.

The liquid crystal layer 108 is arranged between the first substrate 101 and the second substrate 102. The liquid crystal layer 108 is preferably arranged under the vacuum. Alternatively, after being delivered a liquid crystal layer by drops on the first substrate 101, the second substrate 102 may be attached. Particularly, when it becomes a large-sized substrate, it is preferable that a liquid crystal layer is fallen in drops than injected.

Embodiment Mode 2

Emobodiment mode 2 explained is a case in which a continuous pulse is applied to a liquid crystal display device as a method to improve response speed of liquid crystal. Note that, about constitution and a manufacturing method of a liquid crystal display device, FIG. 1 explained with Embodiment Mode 1 may be referred except that a liquid crystal layer is formed by only a liquid crystal material (a chemical compound having a liquid crystal skeleton is not included).

In other words, when electric field is applied or electric field is not applied, response speed of liquid crystal molecules can be improved since a constant oscillation is given to the liquid crystal molecules exisiting in the liquid crystal layer by applying a pulse to the liquid crystal display device repeatedly at regular time intervals. Note that, a pulse here is the voltage which is necessary that liquid crystal responds and it is necessary that a duty ratio of the pulse (a ratio of pulse application time to a cycle of applying the pulse) is 10% or less.

Embodiment 1

In this embodiment, a liquid crystal element including a chemical compound having a liquid crystal skeleton in a liquid crystal layer is formed as described in Embodiment Mode 1 and a result of evaluating an optical property thereof is described.

Manufacturing of a liquid crystal element in this embodiment, a glass substrate that thickness was 0.7 mm and outline is 2 cm×2 cm is used. On the upper side of this glass substrate, an indium tin oxide film was formed as a transparent electrode. The indium tin oxide film was used in an electrode part formed of 7 mm×7 mm form for driving liquid crystal and in an extraction electrode part for applying electric field to liquid crystal from outside. An orientation film for perpendicular orientation (SE1211 produced by Nissan Chemical Industries) was used as an orientation film to orientate a liquid crystal material. A thin film of the perpendicular orientation film was formed on the upper side of the substrate and the film thickness thereof is 60 nm.

Next, the pair of substrates was attached with facing respective the electrode parts on the upper sides of the substrates. The interval between the pair of substrates is set to be 5 μm. A sealing material composed of an epoxy resin was used as method to adhere and fix substrates together. The sealing material used here was obtained by mixing fiber of cylindrical form which contains $SiO_2$ as a main component. A diameter of the fiber is 5 μm. After being attached a counter substrate, the extra portion which does not directly contribute to display of a substrate was cut-offed using a glass scriber and a breaker to form an element.

Commercial MLC2038 (produced by Merck) was used as nematic liquid crystal. Liquid crystalline monomer UCL003 (produced by Dainippon Ink and Chemicals) was added in this liquid crystal. The mixing ratio rate was adjusted so as to be 10 wt % in weight ratio with respect to the liquid crystal. This material was injected between the substrates which have been attached. The injection was performed by vacuum injection method which is generally performed in manufacturing of a liquid crystal element. After the injection, ultraviolet rays were irradiated. Ultraviolet rays had center wavelength of 365 nm and irradiating intensity of 1.2 $mW/cm^2$. Accordingly, a liquid crystal element including a liquid crystalline polymer in a liquid crystal layer was formed.

The response speed was evaluated by using the liquid crystal element. Note that, in this embodiment, the response speed of the liquid crystal element was evaluated by applying a driving voltage to the liquid crystal element between polarizing plates and measuring dimension of change of transmitting light intensity from a light source, after arranging the liquid crystal element between the pair of polarizing plates which is arranged in a cross nicol manner and arranging light source downward the polarizing plate on the lower side and arranging a photoelectron multiplier upward of the polarizing plate on the upper side.

Measurement result is shown in FIG. 4. In FIG. 4, time (response time) is plotted in a horizontal axis, transmitting light intensity is plotted in a vertical axis (right side), and an applied voltage is plotted in vertical side (left side). Note that, transmitting light intensity (V) shown here shows a value obtained by measuring change of transmitting light intensity (change of light intensity) from the light source which is obtained by birefringence property of liquid crystal molecules included in the liquid crystal element, as electric potential from photoelectric change and amplification of the photoelectron multiplier.

In this embodiment, when the liquid crystal element was driven with a pulse of 4 ms and at applied voltage of 6 V, response time of liquid crystal (rising response time) by pulse application was 2 ms and response time of liquid crystal (falling response time) by pulse electric potential removal was 2 ms.

COMPARATIVE EXAMPLE 1

In this comparative example, measurement was performed in the same method as Embodiment 1 by using an element which was manufactured by the method described in Embodiment 1 without adding a chemical compound having a liquid crystal skeleton (liquid crystalline polymer) in the liquid crystal layer. The result is shown in FIG. 5. Therefore, such a dimension that response speed becomes slow with time course in comparison with Embodiment 1 could be confirmed.

Embodiment 2

In this embodiment, described is the result of evaluating an optical property in the case where a liquid crystal element is manufactured as described in Embodiment Mode 2 and a continuous pulse is applied.

Note that, commercial MLC2038 (produced by Merck) which is nematic liquid crystal was used for a liquid crystal layer of the liquid crystal element.

Applied voltage was fixed at 6 V to this liquid crystal element and it was driven with a pulse of pulse width of 4 ms. A pulse was applied repeatedly, and when interval of the pulse was controlled and response time was measured, orientation of liquid crystal was divided into mini-region at duty ratio (the ratio of pulse application time and time of one period of pulse driving waveform) in one period of pulse driving waveform becomes relational of less than or equal to 10%. Orientation state of liquid crystal in this time is shown in FIG. 6(A).

When duty ratio was 8%, response time of liquid crystal (rising response time) by pulse application in this time was 2 ms as shown in FIG. 6(B) and response time of liquid crystal (falling response time) by pulse electric potential removal was 2 ms.

COMPARATIVE EXAMPLE 2

On the other hand, when the duty ratio in Embodiment 2 is larger than 10%, the falling response time of the response time of liquid crystal became 20 ms or more in some cases. The result in the case where the duty ratio is 18% is shown in FIG. 7. In addition, the orientation state of liquid crystal in this time showed orientation which is generally referred to as schlieren texture as shown in FIG. 8. Note that, an enlarged image of liquid crystal molecules 800 in a schlieren texture photography of FIG. 8(A) is shown in FIG. 8(B).

Embodiment 3

In this embodiment, described is an example when the present invention is applied to a liquid crystal display device of active matrix type. In FIG. 3(A), a liquid crystal display device in which a signal line driver circuit 230, a scanning line driver circuit 238, and a pixel portion 231 are formed over a first substrate 200 is shown.

FIG. 3 (B) shows a cross-sectional view of A-A' of the liquid crystal display device and the signal line driver circuit 230 providing a CMOS circuit having an n-channel type TFT 221 and a p-channel type TFT 222 over the first layer 200 is shown. The n-channel type TFT 221 and the p-channel type TFT 222 is preferably formed so that they have a crystalline semiconductor film. A TFT which forms the signal line driver circuit 230 or the scanning driver circuit 238 may be formed by a CMOS circuit, a PMOS circuit, or an NMOS circuit.

The pixel portion 231 has a switching TFT 223 and a capacitor element 258. The switching TFT 223 is preferably formed to have a crystalline semiconductor film. The capacitor element 258 is constituted by a gate insulating film sandwiched between a semiconductor film added with impurities and a gate electrode.

Note that, a TFT of the pixel portion 231 does not have to have high crystallinity as compared to the signal line driver circuit 230 and the scanning line driver circuit 238.

In addition, the pixel portion 231 has a pixel electrode 211 which is connected to one of electrodes of the switching TFT 223. In addition, a third insulating film 209 is provided so as to cover the n-channel type TFT 221, the p-channel type TFT 222, the pixel electrode 211, the TFT for switching 223 and the like.

Additionally, a second substrate 245 corresponding to a counter substrate is prepared. A black matrix 251 is formed in a position corresponding to the signal line driver circuit 230 at least, and a color filter 252 is formed in a position corresponding to at least a pixel portion, and further, a counter electrode 253 is formed over the second substrate 245. The present invention does not have to always provide a black matrix, a color filter, or a counter electrode over the second substrate 245, and it may be provided on the first substrate 200 side. After this, a spacer 256 for keeping substrate interval may also be formed. In addition, a projection 250 for preventing convection of a liquid crystal material may be formed at the same time for the purpose of preventing that bias of distribution of a chemical compound having a liquid crystal skeleton (liquid crystalline monomer, liquid crystalline polymer) included in a liquid crystal layer 254 from arising.

The spacer 256 may also use a spherical thing, or can use so-called a column spacer which is formed by etching an insulating film. Further, height of the projection 250 is made same as a thickness of the liquid crystal layer 254 and may be provided the same function as the spacer 256, and it can be selected suitably whether the spacer 256 and the projection 250 is separated or conformed. Next, the second substrate 245 is performed orientation treatment and attached using a sealing material 243 to the first substrate 200. It is preferable for the sealing material 243 to use an epoxy system resin. In addition, a part of the third insulating film 209 may be left in a position for forming the sealing material 243. Accordingly, adhesion dimension is large and adhesion intensity can be improved. Note that, the spacer 256 for keeping substrate interval may be formed after orientation treatment is performed to an orientation film.

The liquid crystal layer 254 is injected between the first substrate 200 and the second substrate 245. When the liquid crystal layer 254 is injected, it may be performed under the vacuum. In addition, the second substrate 245 may be attached after a liquid crystal layer is delivered on the first substrate 200. Particularly, when in the case of a large-sized substrate, it is preferable that a liquid crystal layer is fallen in drops than injected. Note that, a chemical compound having a liquid crystal skeleton 255 is included in the liquid crystal layer in the present invention, however, a liquid crystalline polymer which is obtained by polymerizing a liquid crystalline monomer can be used as well as a liquid crystalline monomer as the chemical compound 255 having a liquid crystal skeleton. In this embodiment, it is decided to use a liquid crystalline monomer.

A polarizing plate or a circularly polarizing plate may be provided arbitrarily to the first substrate 200 and the second substrate 245 to improve a contrast.

In addition, a flexible print circuit (FPC) 246 is connected to a conductive film 208 provided in a first connection region 232 by an anisotropic conductive resin (ACF). A video signal and a clock signal which correspond to an external input signal through the FPC 246 are received. Only the FPC is shown here, however, a printed wiring board (PWB) is provided through this FPC. And an external signal generation circuit is mounted to a printed wiring basis.

In addition, when ACF is adhered by pressurization or heating, it is necessary to careful not to arise a crack by flexible characteristic of a substrate or softening by heating. For example, a high rigidity substrate may be arranged as support at least at a lower position of the first connection region 232.

In this embodiment, a driver built-in type liquid crystal display device in which the signal line driver circuit 230 and the scanning line driver circuit 238 are provided over the first substrate 200 is described, however, the signal line driver circuit and the scanning line driver circuit may be formed by IC, and may be connected to a signal line, a scanning line or the like by SOG method or TAB method.

As the above, a liquid crystal display device having an active matrix substrate can be manufactured.

Embodiment 4

Electronic apparatuses providing the liquid crystal display device of the present invention include such as a television set (just referred to as television or television receiver), cameras such as a digital camera and a digital video camera, a mobile phone set (just referred to as a mobile phone or a cell-phone), a portable information terminal such as a PDA, a portable game machine, a monitor for a computer, a computer, an audio reproducing device such as a car audio system, and an image reproducing device provided with a recording medium such as a home game machine. Its specific examples are described with reference to FIG. 9.

A portable information terminal apparatuse shown in FIG. 9(A) includes a main body 9201, a display portion 9202 and the like. The liquid crystal display device of the present invention can be applied to the display portion 9202. Accordingly, high speed response is enabled and a portable information terminal apparatuse in which a moving-image display capability is improved can be supplied.

A digital video camera shown in FIG. 9(B) includes a display portion 9701 and a display portion 9702 and the like. High speed response is enabled by using the liquid crystal display device of the present invention to the display portion 9701 and a digital video camera in which a moving-image display capability is improved can be supplied.

A mobile phone shown in FIG. 9(C) includes a main body 9101, a display portion 9102 and the like. High speed response is enabled by using the liquid crystal display device of the present invention to the display portion 9102 and a mobile phone in which a moving-image display capability is improved can be supplied.

A portable television device shown in FIG. 9(D) includes a main body 9301, a display portion 9302 and the like. High speed response is enabled by using the liquid crystal display device of the present invention to the display portion 9302 and a portable television device in which a moving-image display capability is improved can be supplied. In addition, the liquid crystal display device of the present invention can be applied to a broad range of television devices from a small-size one mounted onto a portable terminal such as a mobile phone to a medium-size one which can be taken along, in addition, a big-size one (for example, more than 40 inches).

A portable computer shown in FIG. 9(E) includes a main body 9401, a display portion 9402 and the like. High speed response is enabled by using the liquid crystal display device of the present invention to the display portion 9402 and a portable computer in which a moving-image display capability is improved can be supplied.

A television device shown in FIG. 9(F) includes a main body 9501, a display portion 9502 and the like. High speed response is enabled by using the liquid crystal display device of the present invention to the display portion 9402 and a portable computer in which a moving-image display capability is improved can be supplied.

In this manner, high speed response is enabled by using the liquid crystal display device of the present invention and an electronic appratuse in which a moving-image display capability is improved can be supplied.

INDUSTRIAL APPLICABILITY

It can be used to a display device requiring high speed response such as a display which performs moving-image display mainly.

This invention is based on Japanese Patent Application serial no. 2004-352264 filed in Japan Patent Office on 6th, Dec., 2004, the entire contents of which are hereby incorporated by reference.

Figure 1:
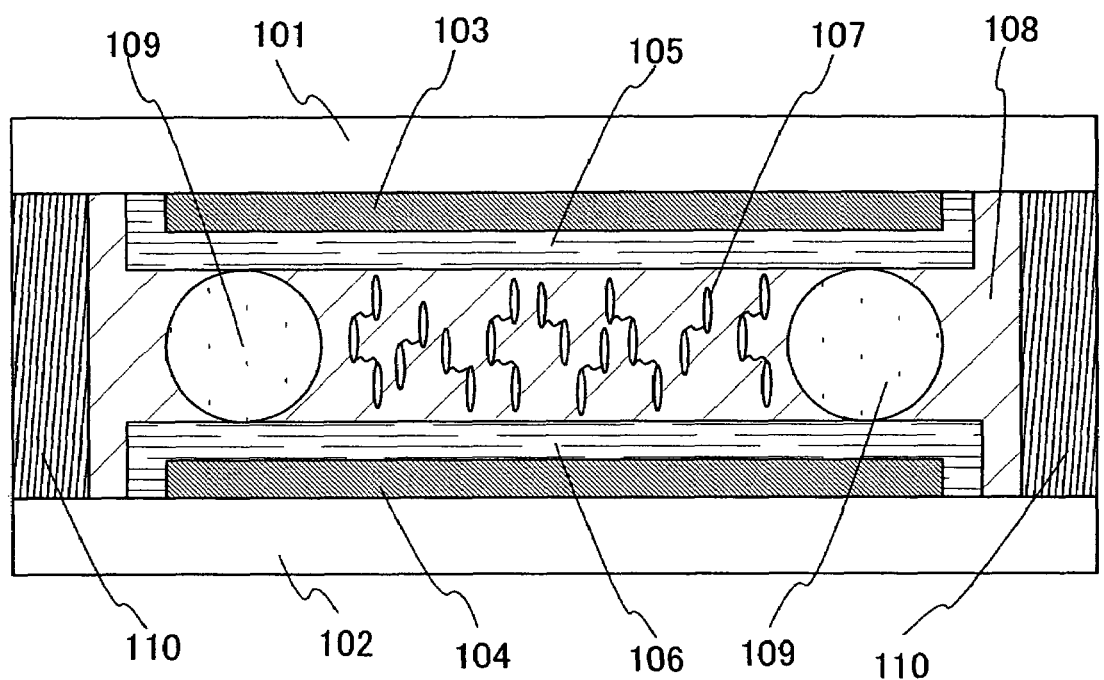
FIG. 1 is a diagram explaining a cross section of a liquid crystal element.
Figure 2A:
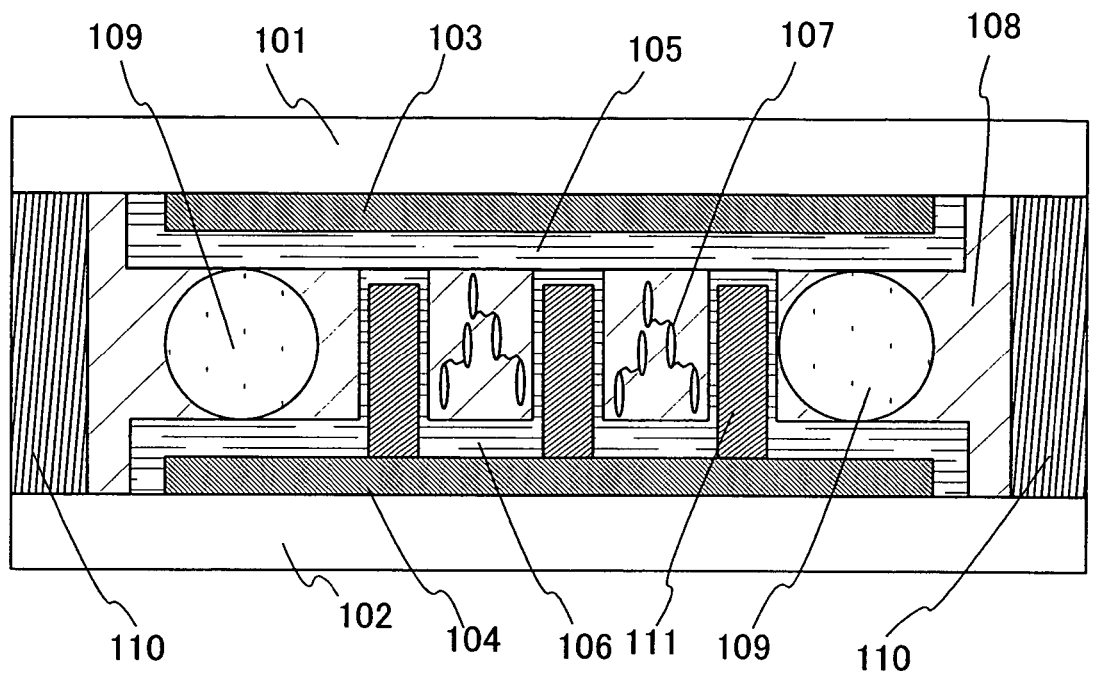
FIGS. 2A and 2B are diagrams each explaining a cross section of a liquid crystal element.
Figure 2B:
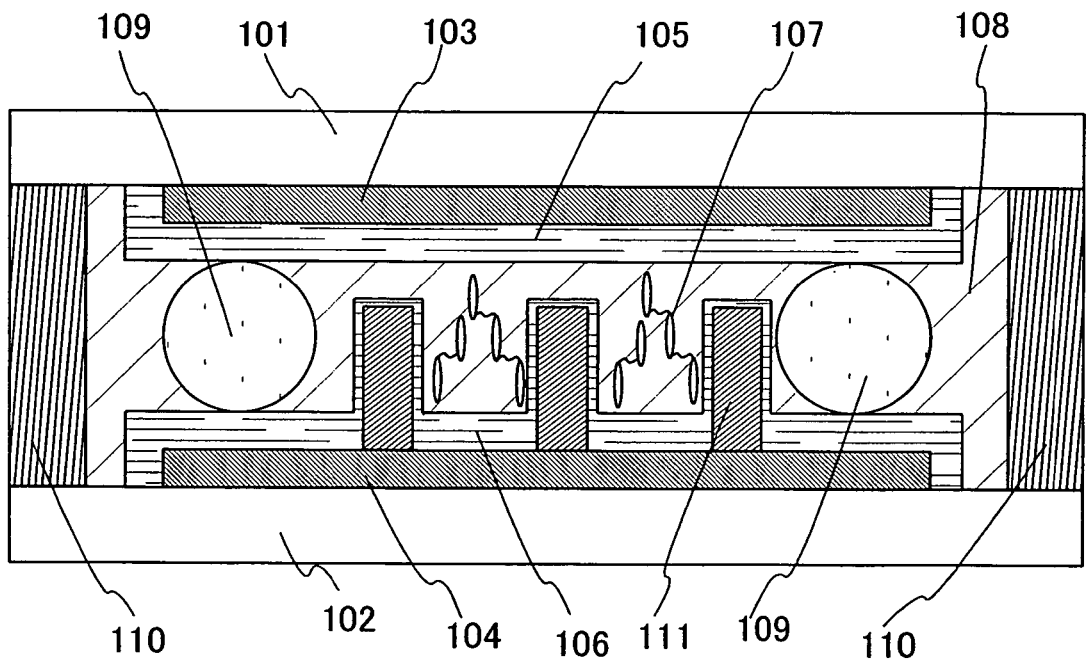
Figure 3A:
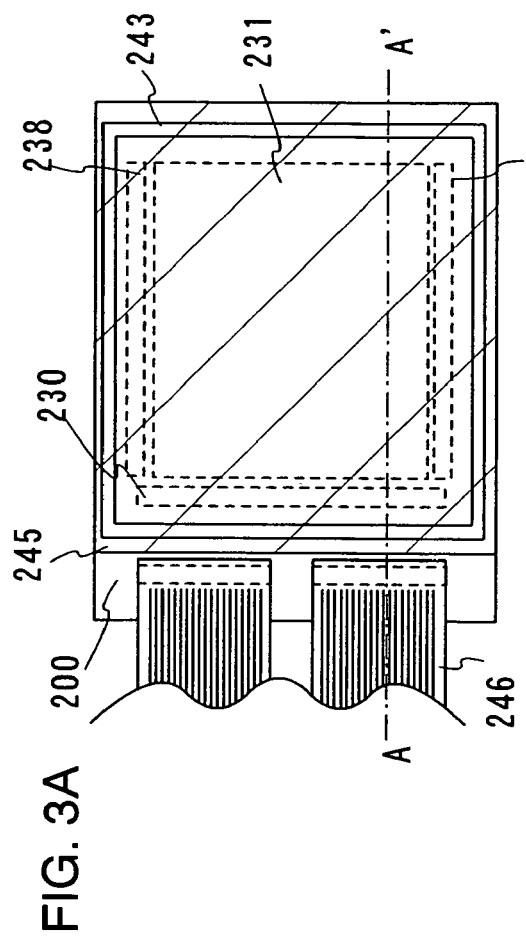
FIGS. 3A and 3B are diagrams explaining a cross section of a liquid crystal display device.
Figure 3B:
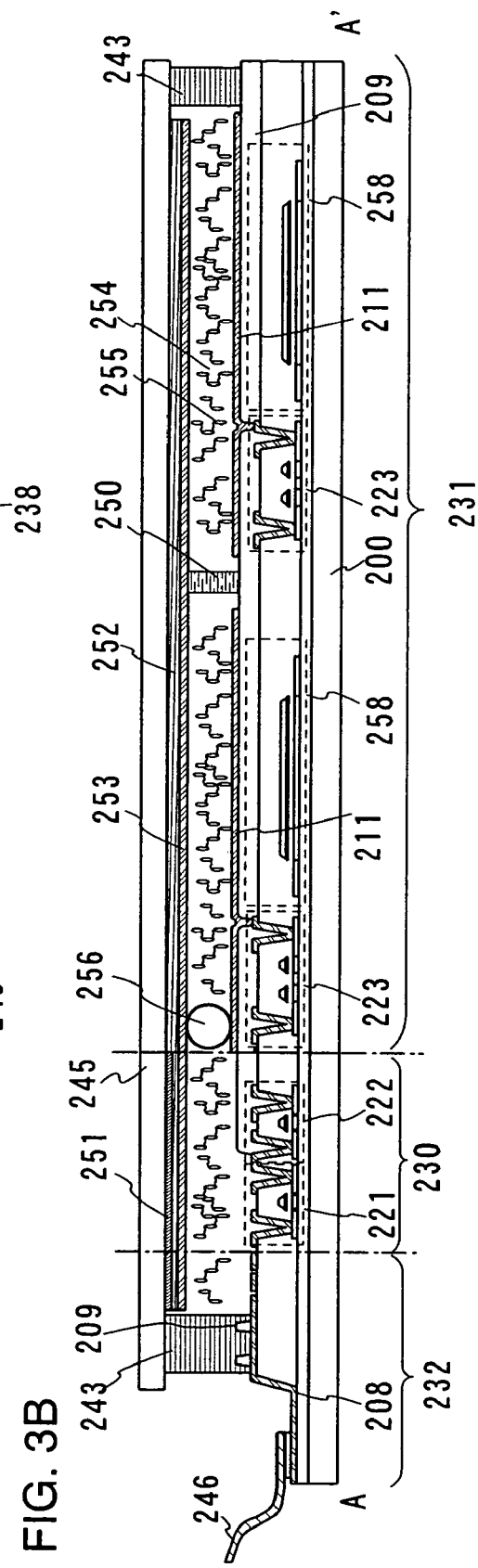
Figure 4:
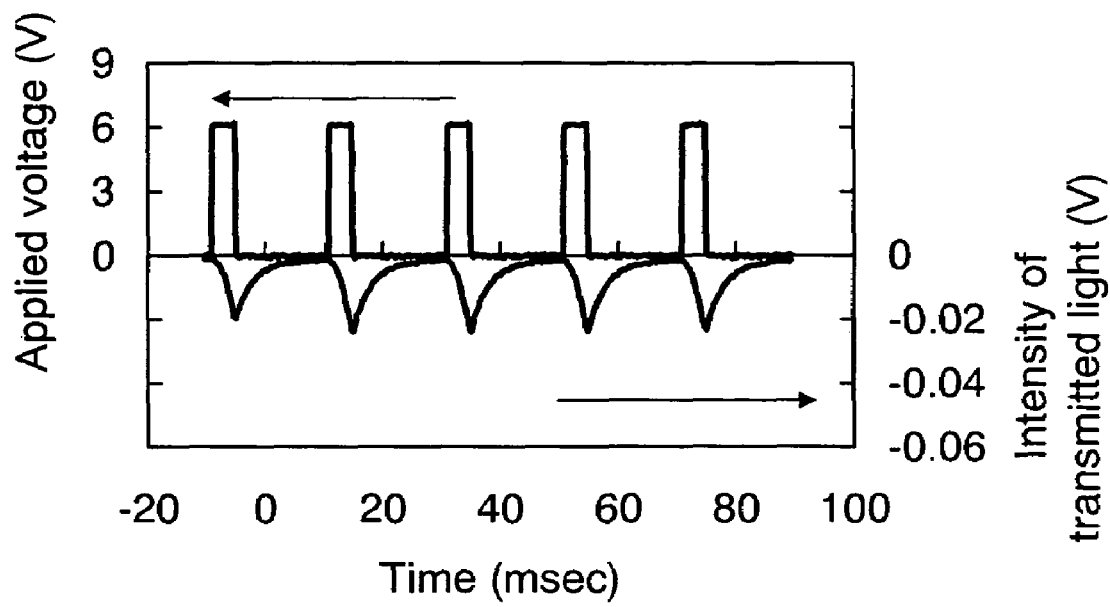
FIG. 4 is a diagram which shows a result measured for electrical characteristic of a liquid crystal element.
Figure 5:
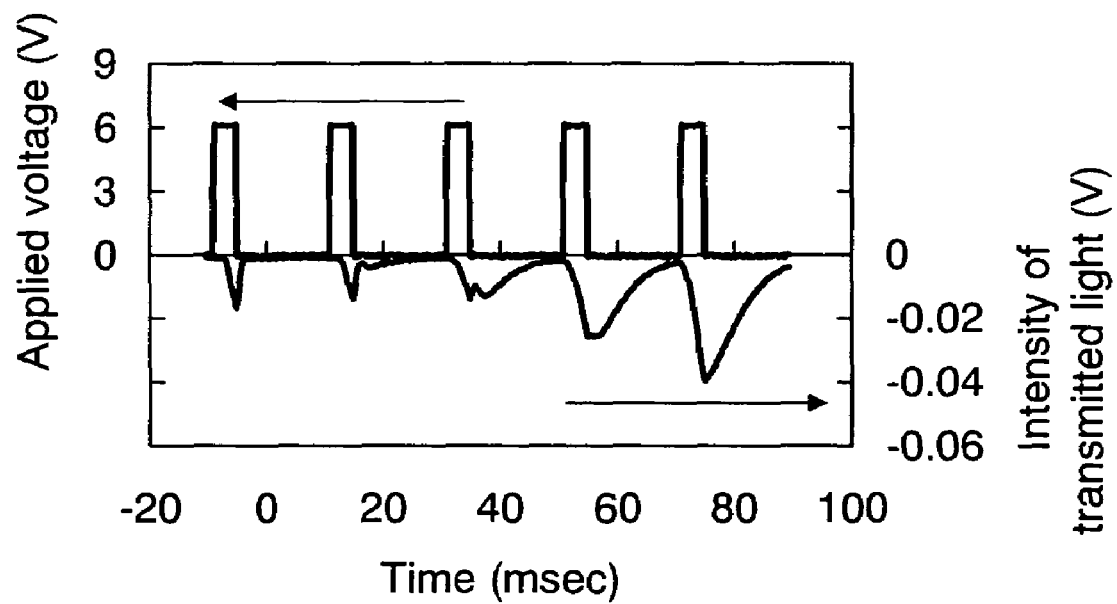
FIG. 5 is a diagram which shows a result measured for electrical characteristic of a liquid crystal element.
Figure 6A:
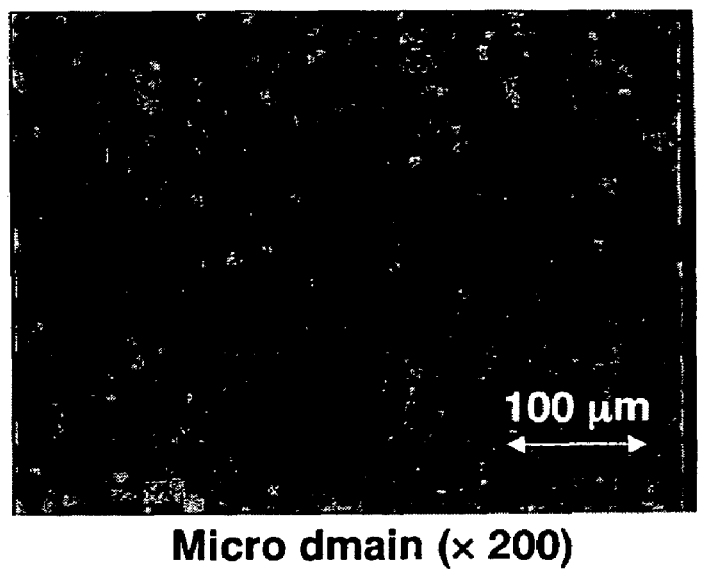
FIGS. 6A and 6B diagrams which show state of a liquid crystal layer and a measurement result for electrical characteristic of a liquid crystal element respectively.
Figure 6B:
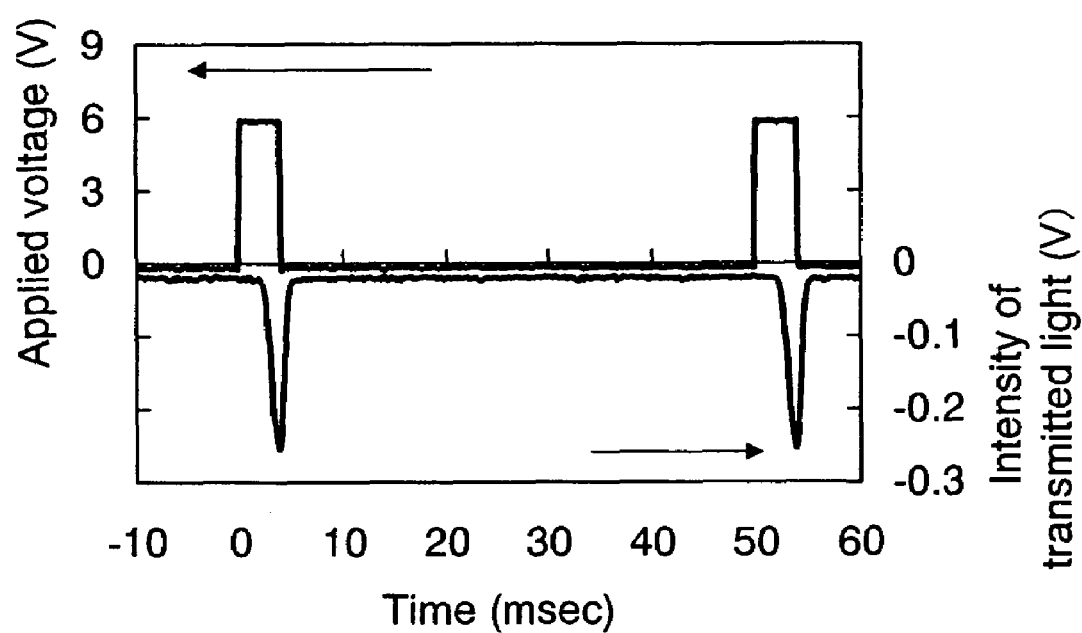
Figure 7:
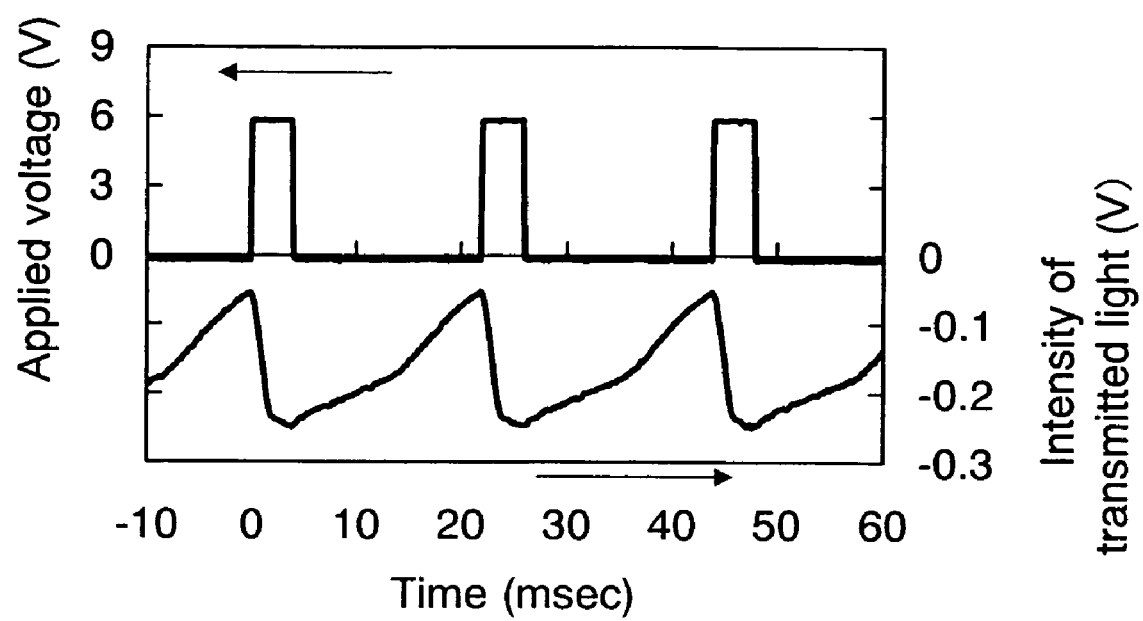
FIG. 7 is a diagram which shows a measurement result for electrical characteristic of a liquid crystal element.
Figure 8A:
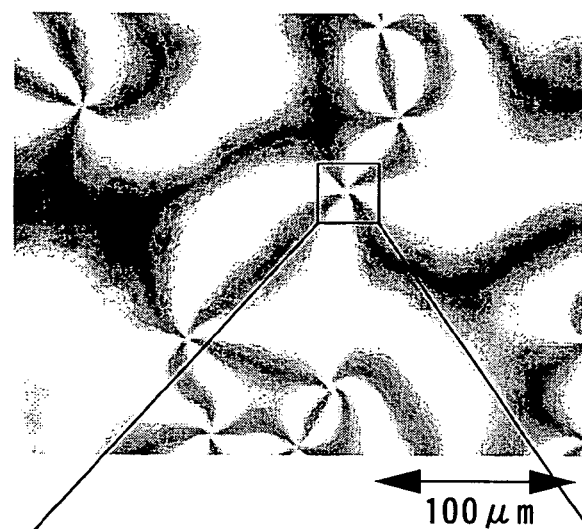
FIGS. 8A and 8B are diagrams which show state of a liquid crystal layer of a liquid crystal element.
Figure 8B:
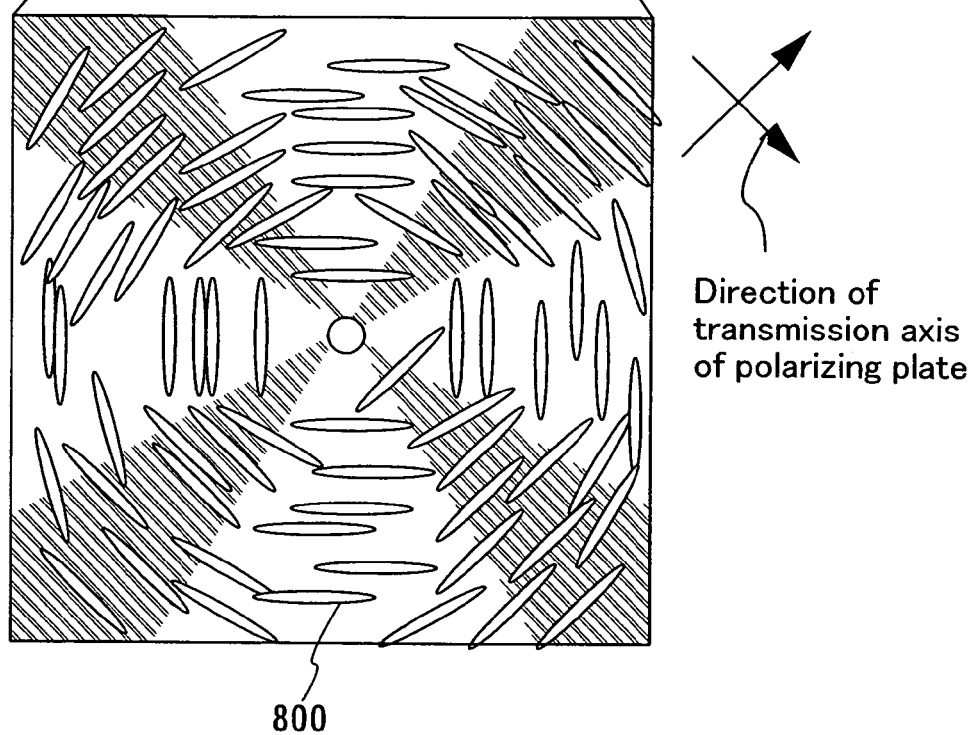
Figure 9A:
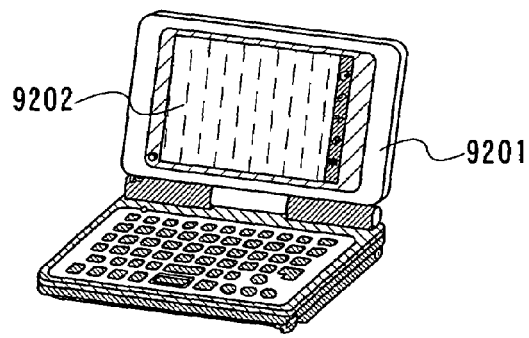
FIGS. 9A to 9F are diagrams which show electronic apparatuses using liquid crystal display devices.
Figure 9B:
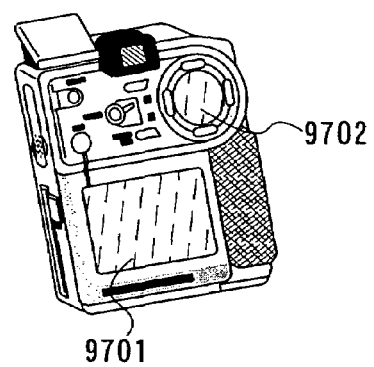
Figure 9C:
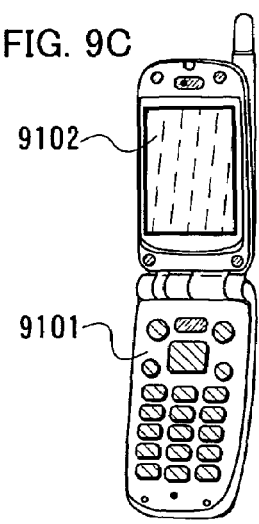
Figure 9D:
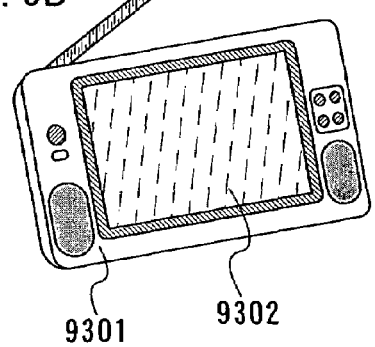
Figure 9E:
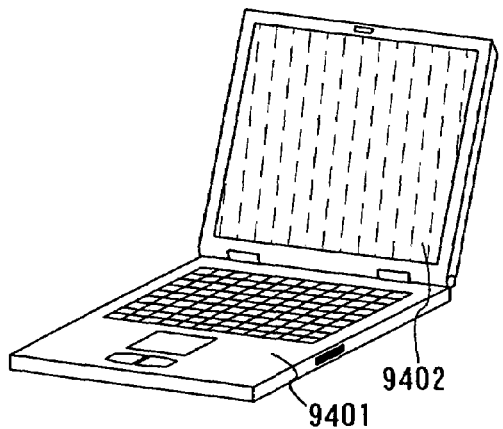
Figure 9F:
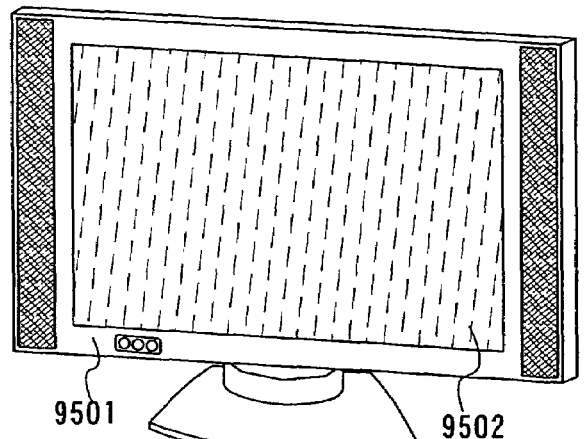

The invention claimed is:

1. A liquid crystal display device comprising:
first and second substrates opposed to each other;
a first electrode formed over the first substrate;
a second electrode formed over the second substrate;
a projection formed over the first electrode;
a first orientation film formed over the first electrode;
a second orientation film formed over the second electrode;
a liquid crystal layer located between the first and second orientation film; and
a pair of polarizing plates with the first and second substrates interposed therebetween,
wherein the liquid crystal layer includes a liquid crystal molecule and a compound having a liquid crystal skeleton,
wherein the liquid crystal layer includes a plurality of domain regions, and
wherein the first orientation film contacts the second orientation film between the projection and the second substrate.

2. A liquid crystal display device comprising:
first and second substrates opposed to each other;
a first electrode formed over the first substrate;
a second electrode formed over the second substrate;
a projection which is a straight line formed over the first electrode;
a first orientation film formed over the first electrode;
a second orientation film formed over the second electrode;
a liquid crystal layer located between the first and second orientation film; and
a pair of polarizing plates with the first and second substrates interposed therebetween,
wherein the liquid crystal layer includes a liquid crystal molecule and a compound having a liquid crystal skeleton,
wherein the liquid crystal layer includes a plurality of domain regions, and
wherein the first orientation film contacts the second orientation film between the projection and the second substrate.

3. A liquid crystal display device comprising:
first and second substrates opposed to each other;
a first electrode formed over the first substrate;
a second electrode formed over the second substrate;
a projection which is a straight line formed over the first electrode;
a first orientation film formed over the first electrode;
a second orientation film formed over the second electrode;
a liquid crystal layer located between the first and second orientation film;
a pair of polarizing plates with the first and second substrates interposed therebetween; and
an active element electrically connected to the first electrode,
wherein the liquid crystal layer includes a liquid crystal molecule and a compound having a liquid crystal skeleton, and
wherein the liquid crystal layer includes a plurality of domain regions, and
wherein the first orientation film contacts the second orientation film between the projection and the second substrate.

4. A liquid crystal display device comprising:
first and second substrates opposed to each other;
a plurality of first electrodes formed over the first substrate;
a second electrode formed over the second substrate;
a projection which is a straight line provided between the plurality of first electrodes;
a first orientation film formed over the plurality of a first electrodes;
a second orientation film formed over the second electrode;
a liquid crystal layer located between the first and second orientation film;
a pair of polarizing plates with the first and second substrates interposed therebetween; and
a plurality of active elements electrically connected to the plurality of first electrodes, respectively;
wherein the liquid crystal layer includes a liquid crystal molecule and a compound having a liquid crystal skeleton, and
wherein the liquid crystal layer includes a plurality of domain regions, and
wherein the first orientation film contacts the second orientation film between the projection and the second substrate.

5. A liquid crystal display device according to claim 1 wherein the compound having the liquid crystal skeleton has a weight ratio at 5 wt% to 15 wt% with respect to the liquid crystal molecule.

6. A liquid crystal display device according to claim 2 wherein the compound having the liquid crystal skeleton has a weight ratio at 5 wt% to 15 wt% with respect to the liquid crystal molecule.

7. A liquid crystal display device according to claim 3 wherein the compound having the liquid crystal skeleton has a weight ratio at 5 wt% to 15 wt% with respect to the liquid crystal molecule.

8. A liquid crystal display device according to claim 4 wherein the compound having the liquid crystal skeleton has a weight ratio at 5 wt% to 15 wt% with respect to the liquid crystal molecule.

9. A liquid crystal display device according to claim 1 wherein the liquid crystal molecule shows a perpendicular orientation.

10. A liquid crystal display device according to claim 2 wherein the liquid crystal molecule shows a perpendicular orientation.

11. A liquid crystal display device according to claim 3 wherein the liquid crystal molecule shows a perpendicular orientation.

12. A liquid crystal display device according to claim 4 wherein the liquid crystal molecule shows a perpendicular orientation.

13. A liquid crystal display device according to claim 1 wherein the compound having the liquid crystal skeleton is a liquid crystal monomer or a liquid crystal polymer.

14. A liquid crystal display device according to claim 2 wherein the compound having the liquid crystal skeleton is a liquid crystal monomer or a liquid crystal polymer.

15. A liquid crystal display device according to claim 3 wherein the compound having the liquid crystal skeleton is a liquid crystal monomer or a liquid crystal polymer.

16. A liquid crystal display device according to claim 4 wherein the compound having the liquid crystal skeleton is a liquid crystal monomer or a liquid crystal polymer.

17. A liquid crystal display device according to claim 13 wherein the liquid crystal monomer is obtained by bonding a liquid crystal skeleton to an acrlyloyl oxy group.

18. A liquid crystal display device according to claim 14 wherein the liquid crystal monomer is obtained by bonding a liquid crystal skeleton to an acrlyloyl oxy group.

19. A liquid crystal display device according to claim 15 wherein the liquid crystal monomer is obtained by bonding a liquid crystal skeleton to an acrlyloyl oxy group.

20. A liquid crystal display device according to claim 16 wherein the liquid crystal monomer is obtained by bonding a liquid crystal skeleton to an acrlyloyl oxy group.

21. A liquid crystal display device according to claim 13 wherein the liquid crystal polymer is obtained by polymerizing the liquid crystalline monomer.

22. A liquid crystal display device according to claim 14 wherein the liquid crystal polymer is obtained by polymerizing the liquid crystalline monomer.

23. A liquid crystal display device according to claim 15 wherein the liquid crystal polymer is obtained by polymerizing the liquid crystalline monomer.

24. A liquid crystal display device according to claim 16 wherein the liquid crystal polymer is obtained by polymerizing the liquid crystalline monomer.

25. A liquid crystal display device according to claim 1 wherein the liquid crystal skeleton is one of a biphenyls skeleton, a tolans skeleton, an esters skeleton, an alkenyls skeleton, a cyclohexenes skeleton, azines skeleton, fluorine-containing condensed rings skeleton, and a naphthalenes skeleton.

26. A liquid crystal display device according to claim 2 wherein the liquid crystal skeleton is one of a biphenyls skeleton, a tolans skeleton, an esters skeleton, an alkenyls skeleton, a cyclohexenes skeleton, azines skeleton, fluorine-containing condensed rings skeleton, and a naphthalenes skeleton.

27. A liquid crystal display device according to claim 3 wherein the liquid crystal skeleton is one of a biphenyls skeleton, a tolans skeleton, an esters skeleton, an alkenyls skeleton, a cyclohexenes skeleton, azines skeleton, fluorine-containing condensed rings skeleton, and a naphthalenes skeleton.

28. A liquid crystal display device according to claim 4 wherein the liquid crystal skeleton is one of a biphenyls skeleton, a tolans skeleton, an esters skeleton, an alkenyls skeleton, a cyclohexenes skeleton, azines skeleton, fluorine-containing condensed rings skeleton, and a naphthalenes skeleton.

* * * * *

UNITED STATES PATENT AND TRADEMARK OFFICE
CERTIFICATE OF CORRECTION

PATENT NO. : 7,563,490 B2  Page 1 of 1
APPLICATION NO. : 11/288215
DATED : July 21, 2009
INVENTOR(S) : Takeshi Nishi et al.

It is certified that error appears in the above-identified patent and that said Letters Patent is hereby corrected as shown below:

Title Page; item (56);
Please delete the following text on the face of the patent, under Other Publications:

"Haralampidis et al. "A new class of oxidosqualene cyclases directs synthesis of antimicrobial phytoprotectants in monocots" *Proc. Natl. Acad. Sci. USA*, 98(23):13431-13436 (2001).''

"Herrera et al. "Cloning and characterization of the Arabidopsis thaliana lupeol synthase gene" *Phytochemistry*, 49(7):1905 (1998).''

"Husselstein-Muller et al. "Molecular cloning and expression in yeast of 2,3-oxidosqualene-triterpenoid cyclases from Arabidopsis thaliana" *Plant Mol. Biol.*, 45(1):75-92 (2001).''

Signed and Sealed this

Thirtieth Day of March, 2010

David J. Kappos
*Director of the United States Patent and Trademark Office*